United States Patent [19]
Yasukawa et al.

[11] 3,980,187
[45] Sept. 14, 1976

[54] HOPPER FOR DISPOSING OF MACHINING REFUSE

[76] Inventors: Masaru Yasukawa; Souzi Yasukawa, both of 122, Sanmaidencho, Tenrishi, Nara, Japan

[22] Filed: May 15, 1975

[21] Appl. No.: 577,855

[52] U.S. Cl. .............................. 214/17 D; 222/385; 222/561
[51] Int. Cl.² ........................................ B65G 65/46
[58] Field of Search .......... 222/385, 413, 370, 561, 222/55, 504; 214/17 D, 17 DA

[56] References Cited
UNITED STATES PATENTS

| | | | |
|---|---|---|---|
| 1,835,989 | 12/1931 | Hofft et al. | 214/17 D X |
| 2,689,069 | 9/1954 | Sparrow et al. | 214/17 D X |
| 2,753,099 | 7/1956 | Jenner et al. | 222/55 |
| 2,888,170 | 5/1959 | McCloskey | 222/561 X |
| 3,215,290 | 11/1965 | Wellons | 214/17 D |

Primary Examiner—Allen N. Knowles
Assistant Examiner—Hadd Lane
Attorney, Agent, or Firm—Stewart and Kolasch, Ltd.

[57] ABSTRACT

A hopper for disposing of machining refuse which comprises a hopper body having an inlet zone at one end and an outlet zone at the other end thereof, said outlet end being angled from said inlet end, said hopper body being provided with side walls which extend outwardly towards said outlet end, so that the diameter of the outlet end is larger than the diameter of the inlet end, gate means operatively associated with said outlet end for opening and closing said outlet end and a screw conveyor means rotatably disposed in the lower portion of the hopper, said screw conveyor means being directed toward the outlet of the hopper.

10 Claims, 2 Drawing Figures

HOPPER FOR DISPOSING OF MACHINING REFUSE

BACKGROUND AND SUMMARY OF THE INVENTION

The present invention relates to a hopper for use in disposing of machining refuse produced as a result of operating a machine tool, such as, for example, lathes, drills, and the like. More particularly, the present invention is directed to a hopper which is used for disposing of machining refuse wherein the sides of the hopper are spread in the outward direction toward the outlet thereof for facilitating the removal of the machining refuse therefrom.

In conventional hoppers it is well known to provide sides for said hoppers which slope inwardly towards the bottom of the hopper where a hole is provided for discharging the contents. A hopper having this shape is commonly used for receiving machining refuse for disposal to a location removed from the machine which produces the refuse. However, difficulties are frequently encountered in removing entangled refuse from the narrowed outlet to the hopper. In such a case, the refuse accumulates in the narrowed outlet until its gradually increasing weight causes the refuse to be discharged, all of a sudden, from the outlet of the hopper in a heavy lump. The present invention is directed to solving these difficulties and to provide an effective means for smoothly eliminating the refuse from the outlet end of the hopper.

Accordingly, an object of the present invention is to overcome the difficulties and disadvantages pointed out hereinabove and to provide a device for accumulating and removing refuse collected during the operation of various machining tools, for example, lathes, drills, and the like.

Another object of the present invention is to provide an improved refuse hopper which is capable of accumulating and conveying away refuse in a smooth and continuous manner.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The hopper which is utilized in accordance with the present invention has the shape of a bent tube, the side walls thereof extending outwardly towards the outlet of the hopper. A screw conveyor is provided on the bottom wall of the hopper and is directed towards the outlet of said hopper. Also, a gate is provided at the outlet of the hopper, said gate being capable of opening and/or closing the outlet to the hopper.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 2:
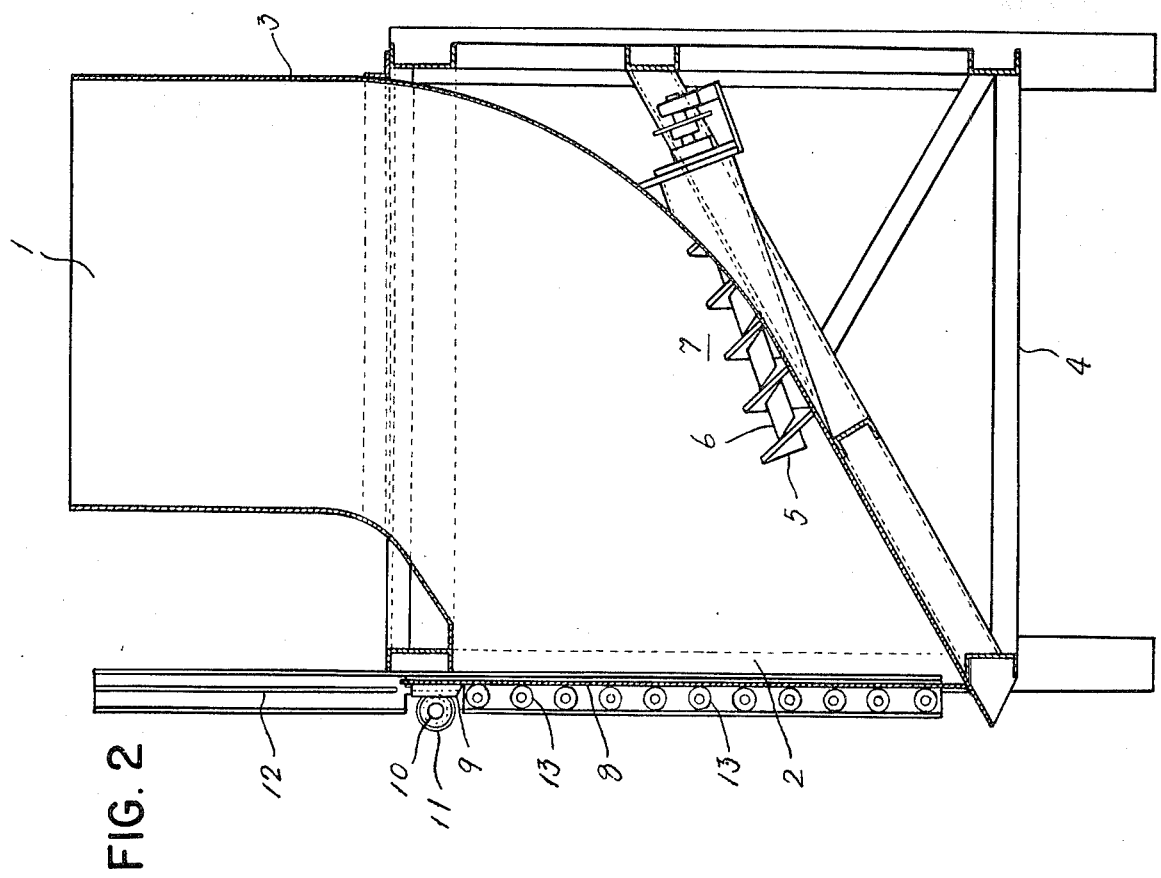
FIG. 2 is a sectional side view of the hopper illustrated in FIG. 1.
Figure 1:
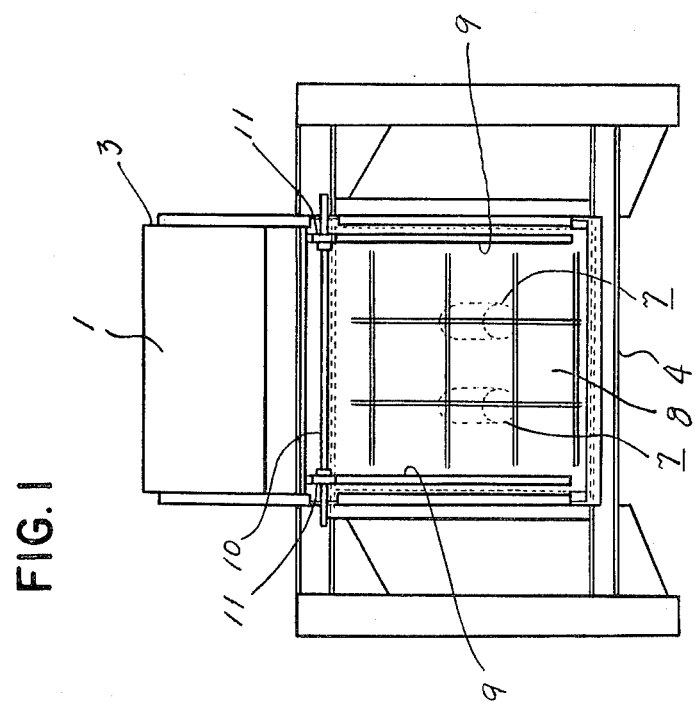
FIG. 1 is a front view of a hopper according to the present invention.

The present invention is directed to a hopper which is used in disposing of machining refuse. The hopper of the present invention comprises a hopper body 3 which has the form of a bent tube and is provided with an inlet 1 in one end thereof and an outlet 2 in the other end thereof. The inside diameter of the outlet 2 is larger than the inside diameter of the inlet 1. The lower part of the hopper body is housed within a framework 4. On the bottom side wall of the hopper there is provided a screw conveyor 7 containing a rotatable axis 6 and a blade 5 which is directed from the bottom side wall towards the outlet 2.

The outlet 2 is provided with a gate 8 which is capable of being raised and/or lowered to open and close the outlet. The gate includes a pair of toothed bars or racks 9 in their opposite edge portions, said racks being adapted to engage with pinions 11 disposed on a rotatable shaft 10. Thus, when the shaft 10 is rotated, the gate 8 is raised or lowered under the guidance of a guiding frame 12 and rollers 13. The raised gate is housed within the guiding frame 12. Also, the raising and/or lowering of the gate can be achieved through the use of an electric motor.

In using the hopper, the gate 8 is closed and the machining refuse is permitted to accumulate inside of the hopper in a predetermined amount. In accumulating the refuse, the screw conveyor 7 can be rotated to help to pile up the refuse inside of the hopper, when it is necessary. After the gate is opened, the stored-up refuse readily slides from the outlet 2 of the hopper because of the increased size of the outlet and also because the outlet is bent and/or canted in the downward and sideways direction, relative to the inlet. When necessary, the screw conveyor 7 can also be utilized to facilitate the removal of the refuse from the outlet end of the hopper. As is readily apparent from the above discussion, accumulated refuse can be readily removed from the hopper without encountering the problem of clogging up the outlet with entangled refuse.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A hopper for disposing of machining refuse which comprises a hopper body having an inlet zone provided with an inlet end and an outlet zone provided with an outlet end, said outlet zone being angled from said inlet zone, said hopper body being provided with side walls which extend outwardly towards said outlet end of said outlet zone, so that the diameter of the outlet end is larger than the diameter of the inlet end, gate means operatively associated with said outlet end for opening and closing said outlet end and at least one screw conveyor means rotatably disposed in the lower portion of the hopper in said outlet zone, said screw conveyor means being directed toward the outlet end of the hopper.

2. The hopper of claim 1, wherein the hopper body is mounted within a framework so that the inlet end of the hopper is disposed in a vertical position and the outlet end of the hopper is disposed downwardly and at an angle from said vertical position.

3. The hopper of claim 1, wherein the hopper body is provided with a bottom floor and said screw conveyor is disposed in said bottom floor.

4. The hopper of claim 1, wherein the gate means includes a pair of toothed racks disposed on opposite edge portions of the hopper outlet and a rotatable shaft means is operatively associated with said toothed racks whereby, when the shaft means is rotated the gate means is raised or lowered in front of the outlet of the hopper body.

5. The hopper of claim 4, wherein guide frame means and roller means are provided for guiding the gate means during its raising and lowering operation.

6. The hopper of claim 5, wherein the guideing frame extends above the outlet to the hopper body, said guiding frame housing the gate means in its raised position.

7. The hopper of claim 6, wherein motor means are provided for raising and lowering the gate means.

8. The hopper of claim 1, wherein the screw conveyor means is provided with drive means.

9. The hopper of claim 1, wherein the hopper body has a substantially uniform diameter in the inlet zone and a gradually increasing diameter in the outlet zone which increases toward the outlet end of the hopper body.

10. A hopper for disposing of machining refuse which comprises a hopper body having an inlet zone provided with an inlet end and an outlet zone provided with an outlet end, said outlet zone being angled from said inlet zone with the hopper body having a substantially uniform diameter in the inlet zone and a gradually increasing diameter in the outlet zone so that the diameter of the outlet end is larger than the diameter of the inlet end, gate means operatively associated with said outlet end for opening and closing said outlet end, said gate means including a pair of toothed racks disposed on opposite edge portions of the hopper outlet end and a rotatable shaft means operatively associated with said toothed racks whereby when the shaft means is rotated the gate means is raised or lowered in front of the outlet end of the hopper body, said gate means being provided with guide frame means and roller means for guiding the gate means during its raising and lowering operation, said guide frame means extending above the outlet to the hopper body and housing the gate means in its raised position and at least one screw conveyor means rotatably disposed in the lower portion of the hopper body in said outlet zone, said screw conveyor means being directed toward the outlet end of the hopper.

* * * * *